US008482785B2

(12) United States Patent
Aoki

(10) Patent No.: US 8,482,785 B2
(45) Date of Patent: Jul. 9, 2013

(54) IMAGE READING APPARATUS AND CONTROL METHOD OF IMAGE READING APPARATUS OF AUTOMATIC SHEET DISCRIMINATE CROPPING

(75) Inventor: Nobushige Aoki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1493 days.

(21) Appl. No.: 11/390,173

(22) Filed: Mar. 28, 2006

(65) Prior Publication Data

US 2006/0221411 A1 Oct. 5, 2006

(30) Foreign Application Priority Data

Mar. 31, 2005 (JP) ................................. 2005-101551

(51) Int. Cl.
*G06K 15/00* (2006.01)

(52) U.S. Cl.
USPC .......... 358/1.18; 358/474; 358/448; 382/173; 382/176; 382/112; 382/190

(58) Field of Classification Search
USPC ................. 358/1.18, 474, 448; 382/173, 176, 382/112, 190
See application file for complete search history.

(56) References Cited

U.S. PATENT DOCUMENTS

| | | | | |
|---|---|---|---|---|
| 5,767,978 A * | 6/1998 | Revankar et al. | ............. | 358/296 |
| 6,430,320 B1 * | 8/2002 | Jia et al. | ......... | 382/289 |
| 6,738,154 B1 * | 5/2004 | Venable | ........ | 358/1.15 |
| 6,757,081 B1 * | 6/2004 | Fan et al. | ....... | 358/474 |
| 6,930,799 B2 * | 8/2005 | Hsu et al. | ........ | 358/1.9 |
| 7,113,656 B2 * | 9/2006 | Jiang | ............. | 382/306 |
| 7,133,571 B2 * | 11/2006 | Cheatle | .......... | 382/282 |
| 7,162,084 B2 * | 1/2007 | Herley | .......... | 382/173 |
| 7,308,155 B2 | 12/2007 | Terada | ......... | 382/284 |
| 7,454,697 B2 * | 11/2008 | Kremer et al. | ............ | 715/251 |
| 7,460,268 B2 * | 12/2008 | Goto et al. | ..... | 358/1.9 |
| 7,548,356 B2 * | 6/2009 | Han et al. | ...... | 358/497 |

(Continued)

FOREIGN PATENT DOCUMENTS

JP 57-23618 2/1982
JP 6-350861 12/1994

(Continued)

OTHER PUBLICATIONS

Japanese Electric Manual (Scanner Section, Windows Version) of Epson Multi-printer PM-A900, recognized as publicly known on Oct. 22, 2004, and partial English language translation thereof.

(Continued)

*Primary Examiner* — Benny Q Tieu
*Assistant Examiner* — Quyen V Ngo
(74) *Attorney, Agent, or Firm* — Fitzpatrick, Cella, Harper & Scinto

(57) ABSTRACT

An image reading apparatus in which when one or a plurality of original sheets are put on an original plate and are read, a desired image can be automatically cropped without previously setting a cropping method by a user is provided. A control method of such an image reading apparatus is also provided. The image on the original plate is read. The type of original sheet is discriminated on the basis of color characteristics information of the read image on the original plate. One of plural read image cropping methods is selected in accordance with the discriminated original sheet type. The read image on the original plate is cropped by the selected cropping method.

11 Claims, 8 Drawing Sheets

U.S. PATENT DOCUMENTS

| | | | |
|---|---|---|---|
| 7,570,826 B2 * | 8/2009 | Chiang et al. | 382/244 |
| 2002/0051242 A1 * | 5/2002 | Han et al. | 358/474 |
| 2003/0098983 A1 | 5/2003 | Terada | 358/1.2 |
| 2004/0001228 A1 * | 1/2004 | Goto et al. | 358/2.1 |
| 2004/0181754 A1 * | 9/2004 | Kremer et al. | 715/526 |
| 2005/0030563 A1 * | 2/2005 | Matsunami et al. | 358/1.9 |
| 2005/0207675 A1 * | 9/2005 | Fuchigami et al. | 382/298 |
| 2005/0219619 A1 * | 10/2005 | Ohnishi | 358/2.1 |
| 2005/0276477 A1 * | 12/2005 | Lin et al. | 382/173 |
| 2006/0114484 A1 * | 6/2006 | Kitora | 358/1.13 |
| 2006/0152765 A1 * | 7/2006 | Adachi | 358/3.06 |
| 2006/0215232 A1 * | 9/2006 | Ziv-el | 358/448 |
| 2007/0002348 A1 * | 1/2007 | Hagiwara | 358/1.13 |
| 2007/0122062 A1 * | 5/2007 | Jacobs | 382/305 |
| 2008/0316549 A1 * | 12/2008 | Bush et al. | 358/488 |

FOREIGN PATENT DOCUMENTS

| | | |
|---|---|---|
| JP | 2003-46731 | 2/2003 |
| JP | 2003-046734 | 2/2003 |
| JP | 2003-163801 | 6/2003 |

OTHER PUBLICATIONS

Japanese Office Action dated Jan. 15, 2010, from corresponding Japanese Patent Application No. 2005-101551, and English language translation thereof.

* cited by examiner

FIG. 8A
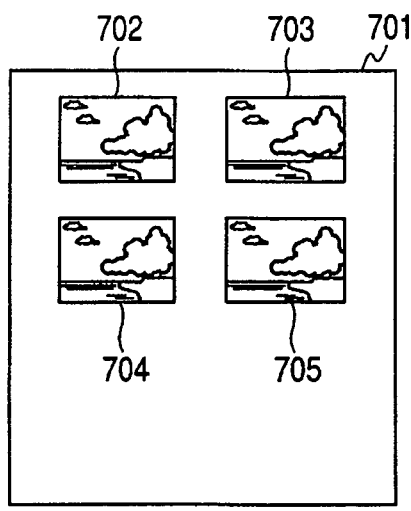
FIG. 8B
FIG. 8C
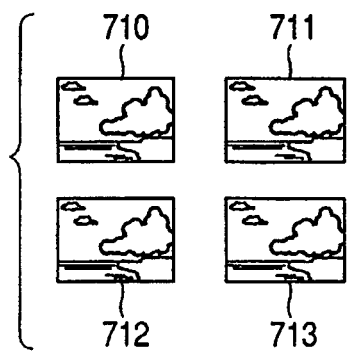
FIG. 8D
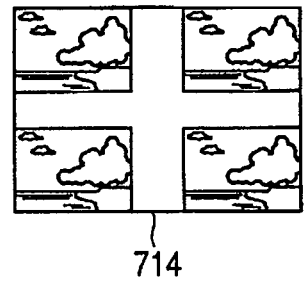

IMAGE READING APPARATUS AND CONTROL METHOD OF IMAGE READING APPARATUS OF AUTOMATIC SHEET DISCRIMINATE CROPPING

BACKGROUND OF THE INVENTION

1. Field of the Invention

The invention relates to an image reading apparatus and a control method of the image reading apparatus and, more particularly, to an image reading apparatus in which when the image reading apparatus reads one or a plurality of original sheets, an image on the whole area of an original plate is read and an image (images) corresponding to the original sheet (sheets) is(are) automatically cropped on the basis of the image on the whole area of the original plate and to a control method of such an image reading apparatus.

2. Related Background Art

In a conventional image reading apparatus, generally, there is used a reading method whereby when an original sheet is read, one original sheet is put onto an original plate, an image on the whole area of the original plate is read, a position and a size of the original sheet are automatically detected on the basis of the read image, and an image corresponding to the original sheet is automatically cropped, by using dedicated scanner driver software corresponding to the TWAIN standard (hereinbelow, such software is referred to as a "TWAIN driver").

In the case of using such a reading method, since a user does not need to designate the reading size of the original sheet and manually crop the read image, he/she can easily obtain a desired image.

The reading method of automatically cropping one image in accordance with the original sheet on the original plate as mentioned above is called an "auto-crop" hereinbelow.

In the conventional image reading apparatus, there has been known a reading method whereby a plurality of original sheets are put onto the original plate, an image on the whole area of the original plate is read, positions and sizes of the plurality of original sheets on the whole area of the original plate are automatically detected on the basis of the read image, and a plurality of images each corresponding to each original sheet are automatically cropped by using the TWAIN driver (for example, refer to Japanese Patent Application Laid-open No. 2003-46731).

The reading method of automatically cropping the images corresponding to a plurality of original sheets on the original plate is called a "multi-crop" hereinbelow.

The multi-crop is mainly effective when a plurality of pictures are simultaneously read as different images and is used for an application field of pictures.

In the multi-crop, generally, an inclination correction is made simultaneously with the cropping of the images corresponding to the original sheets.

Further, in the conventional image reading apparatus, there has been known a reading method whereby when the original sheet is read, a type of original sheet such as "picture", "text", "graphics", or the like is automatically discriminated on the basis of color characteristics information such as a density histogram or the like of image data of the read original sheet, and an optimum color correcting process according to the type of original sheet is executed (for example, refer to Japanese Patent Application Laid-open Nos. S57-23618 (1982) and H06-350861 (1994)).

According to the inventions disclosed in Japanese Patent Application Laid-open Nos. S57-23618 (1982) and H06-350861 (1994), the type of original sheet is automatically discriminated on the basis of the image data.

However, in the automatic cropping of the original sheet(s) according to the auto-crop or the multi-crop, there is such a problem that the user needs to previously set a desired mode of either the auto-crop or the multi-crop and, if such a setting process is erroneously made, a desired image cannot be obtained.

FIGS. 8A to 8D are explanatory diagrams of an image reading apparatus.

When four pictures (photographs) 702, 703, 704, and 705 are set onto an original plate 701 as shown in FIG. 8A, the multi-crop is set, and they are read, four images 710, 711, 712, and 713 are correctly cropped as shown in FIG. 8C. However, there is such a problem that if the auto-crop is erroneously set and they are read, the four pictures 702, 703, 704, and 705 are cropped as one image 714 as shown in FIG. 8D.

FIGS. 9A to 9D are explanatory diagrams of an image reading apparatus.

When one original sheet 802 constructed by characters and pictures is set onto an original plate 801 as shown in FIG. 9A, the auto-crop is set, and they are read, one image 804 is correctly cropped as shown in FIG. 9C. However, there is such a problem that if the multi-crop is erroneously set and it is read, parts of the original sheet are erroneously cropped as different images 805, 806, 807, and 808 as shown in FIG. 9D in dependence on a type of original sheet.

SUMMARY OF THE INVENTION

It is an object of the invention to provide an image reading apparatus in which when one or a plurality of original sheets is(are) put on an original plate and is(are) read, a desired image can be automatically cropped without previously setting a cropping method by the user and to provide a control method of such an image reading apparatus.

According to the invention, there is provided an image reading apparatus comprising: reading means for reading an image on an original plate with respect to one or a plurality of original sheets put on the original plate; analyzing means for analyzing color characteristics information of the image of the original plate read by the reading means; discriminating means for discriminating a type of the original sheet on the basis of an analysis result of the analyzing means; cropping selecting means for selecting one of a plurality of read image cropping methods in accordance with the original sheet type discriminated by the discriminating means; and cropping means which has a plurality of methods of cropping the images from the image on the original plate and crops the image on of the original plate read by the reading means by the cropping method selected by the cropping selecting means.

According to the invention, there is provided a control method of an image reading apparatus, comprising: a reading step of reading an image on an original plate with respect to one or a plurality of original sheets put on the original plate; an analyzing step of analyzing color characteristics information of the image on the original plate read in the image reading step; a discriminating step of discriminating a type of the original sheet on the basis of an analysis result of the analyzing step; a cropping selecting step of selecting one of a plurality of read image cropping methods in accordance with the original sheet type discriminated in the discriminating step; and a cropping step which has a plurality of methods of cropping the images from the image on the original plate and crops the image on the original plate read in the reading step by the cropping method selected in the cropping selecting step.

According to the invention, in the image reading apparatus, when one or a plurality of original sheets is(are) put on the original plate and is(are) read, the image on the original plate is read, the type of original sheet is automatically discriminated from the color characteristics information of the read image, and the original sheet cropping method is automatically switched in accordance with the discrimination result. Therefore, an effect that the desired image can be automatically obtained without previously setting the cropping method by the user is obtained.

BRIEF DESCRIPTION OF THE DRAWINGS

FIGS. 8A, 8B, 8C and 8D are explanatory diagrams of the image reading apparatus.

DETAILED DESCRIPTION OF THE PREFERRED EMBODIMENT

Figure 1:
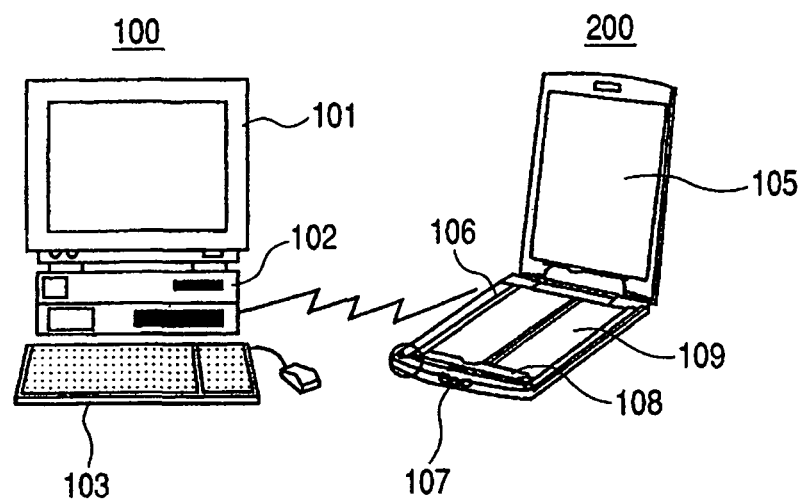
FIG. 1 is a diagram showing an image reading apparatus IR1 according to the embodiment 1 of the invention.

FIG. 1 is a diagram showing an image reading apparatus IR1 according to the embodiment 1 of the invention.

The image reading apparatus IR1 has a PC (personal computer) 100 and a flat bed scanner (hereinafter, abbreviated to a "scanner") 200.

The PC 100 has a display 101, a PC main body 102, and a keyboard 103.

The scanner 200 has an original plate cover 105, a mark 106, a scanner button 107, an original sheet reading unit 108, and original plate glass 109. Although not shown, the scanner 200 has: a motor for driving the original sheet reading unit in the sub-scanning direction; and a signal processing circuit board for executing a process of an image signal read by a photoelectric converting element array. The scanner 200 is connected to a host computer 300 by a USB cable.

The original plate cover 105 presses a set original sheet and a color of the original plate side is white. The mark 106 is an original sheet registration mark with which a position of the original sheet is matched when the sheet is set. The original sheet reading unit 108 is a unit to read the set original sheet and is constructed by an LED for illuminating the original sheet, the photoelectric converting element array, a lens for forming an image of the original sheet onto the photoelectric converting element array, and the like.

The original plate glass 109 is glass on which the original sheet is put. The original sheet is put onto the original plate glass 109 and the original sheet reading unit 108 reads an image of the original sheet.

Figure 2:
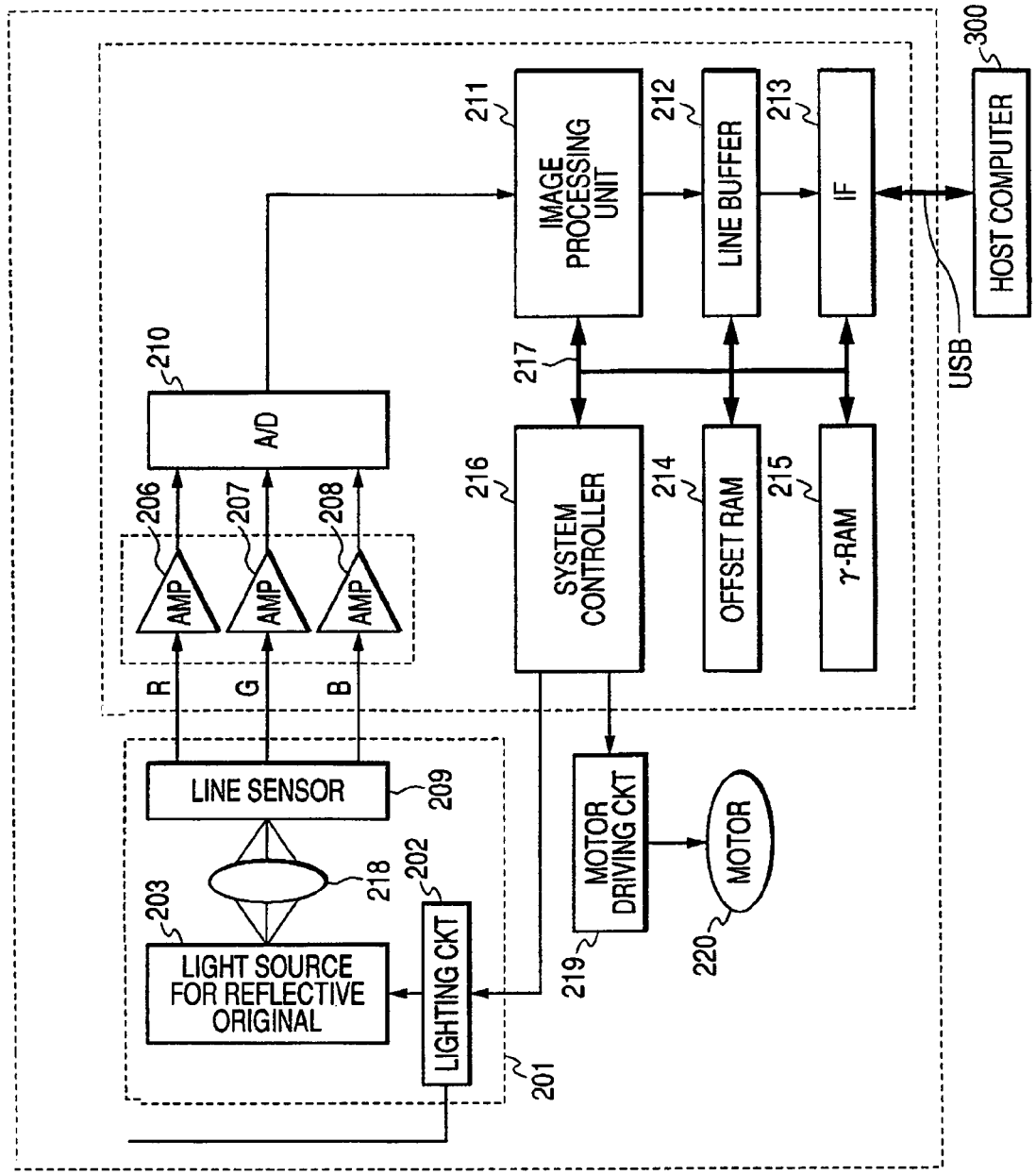
FIG. 2 is a block diagram showing a functional construction of a scanner 200.

FIG. 2 is a block diagram showing a functional construction of the scanner 200.

The scanner 200 has an optical unit 201, a light source 204 for a transparent original sheet, an electric circuit board 205, a motor driving circuit 219, and a motor 220.

The optical unit 201 is constructed by a light source lighting circuit 202, a light source 203 for the reflective original sheet, and an image forming lens 218. A sensing unit to detect a light amount of the light source is included in the light source lighting circuit 202.

The electric circuit board 205 has analog gain controllers 206, 207, and 208 of R, G, and B, an A/D converter 210, an image processing unit 211, a line buffer 212, an interface unit (I/F unit) 213, an offset RAM 214, a gamma-RAM (γ-RAM) 215, a system controller 216, and a CPU bus 217.

The analog gain controllers 206, 207, and 208 of R, G, and B variably amplify analog image signals which are outputted from a line sensor 209, respectively. The A/D converter 210 converts the analog image signals which are outputted from the variable analog gain controllers 206, 207, and 208 into digital image signals, respectively. The image processing unit 211 executes image processes such as offset correction, shading correction, digital gain control, color balance control, masking, resolution conversion in the main and sub-scanning directions, and the like to the digital image signals.

The line buffer 212 is used as a temporary storing area of the image data. The I/F unit 213 makes bidirectional communication with the host computer 300. In the embodiment 1, the I/F unit 213 is realized by a USB interface. The offset RAM 214 is used as a working area for executing the image processes, and used to correct offsets among the RGB lines in the line sensor 209 where each of line sensors for RGB arranged in parallel has a predetermined offset. Also, the offset RAM 214 temporarily stores various kinds of data about shading correction and the like.

The γ-RAM 215 stores a gamma curve and makes gamma correction. The system controller 216 makes various kinds of control in accordance with commands from the host computer 300.

The CPU bus 217 is a system bus for connecting the system controller 216, image processing unit 211, line buffer 212, I/F unit 213, offset RAM 214, and γ-RAM 215 and is constructed by an address bus and a data bus.

The motor driving circuit 219 for a pulse motor outputs an excitation switching signal of the pulse motor 220 by a signal from the system controller 216.

Figure 3:
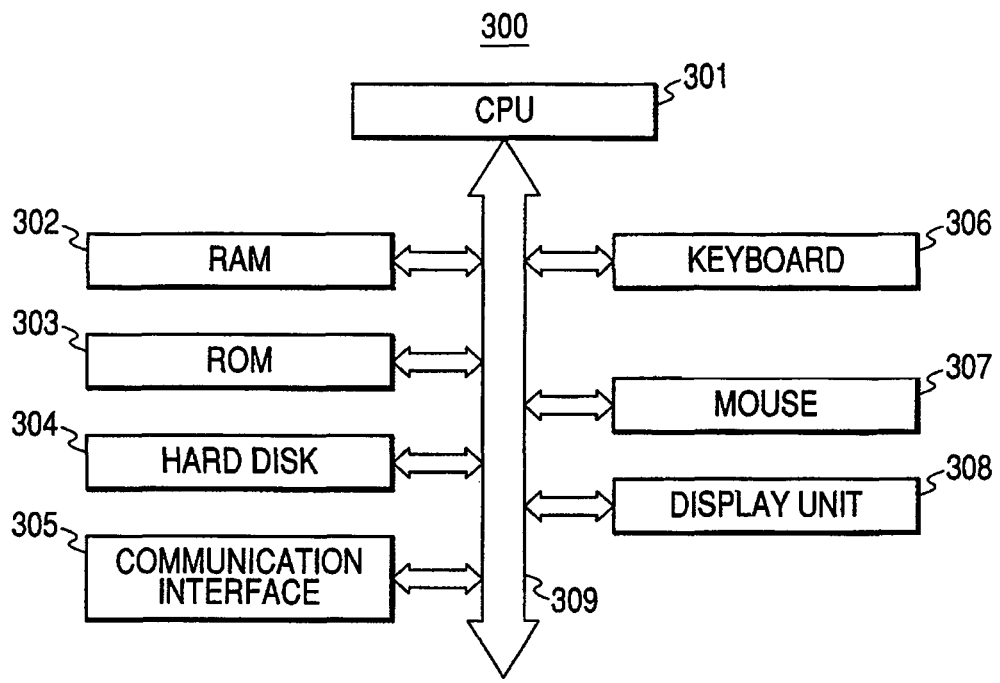
FIG. 3 is a block diagram showing a system construction of a general host computer 300 which is used to control the scanner 200.

FIG. 3 is a block diagram showing a system construction of the general host computer 300 which is used to control the scanner 200.

The host computer 300 has a central processing unit (CPU) 301, a RAM 302, a ROM 303, a hard disk 304, a communication interface (I/F) 305, a keyboard 306, a mouse 307, a display unit 308, and a system bus 309.

The CPU 301 arithmetically operates, discriminates, and controls the data and commands. An operating system (hereinafter, abbreviated to an OS) and other control programs have been stored in The CPU 301.

The communication interface 305 is used to communicate data with a scanner based on USB, SCSI, wireless manner, or the like. The keyboard 306 is used as a user interface.

The display unit 308 comprises a graphics controller and a CRT or a liquid crystal display (LCD).

A control program 400 which operates on the host computer 300 and its data processing construction will now be described.

Figure 4:
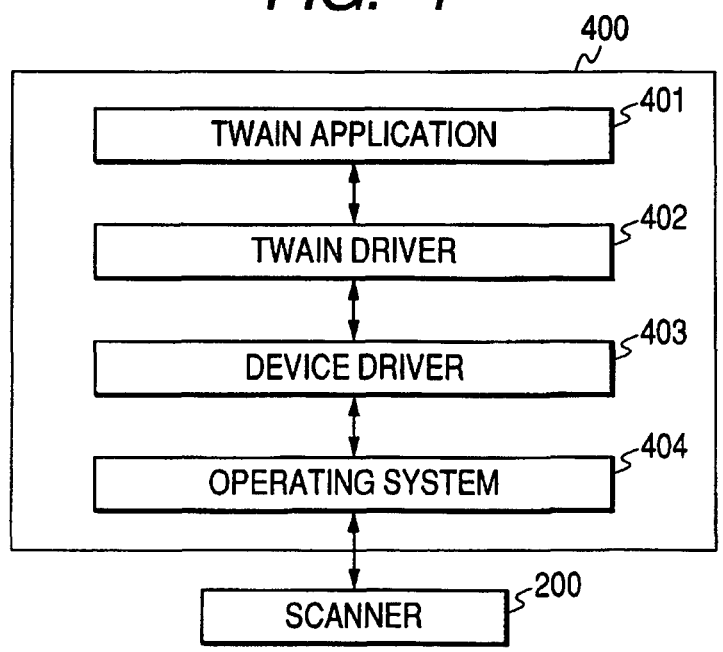
FIG. 4 is a diagram for explaining a control program 400 which operates on the host computer 300.

FIG. 4 is a diagram for explaining the control program 400 which operates on the host computer 300.

A TWAIN application 401 is a scanner application corresponding to the TWAIN standard and has a GUI. In accordance with an instruction of the user, the TWAIN application 401 makes reading settings such as "type of original sheet", "reading size", "reading resolution", and the like into a TWAIN driver 402, reads the image from the scanner 200 through the TWAIN driver 402, and displays the read image onto the display unit 308. The TWAIN application 401 also has a function of saving the read image onto the file, a function of transmitting the image to E-mail software, a function of printing the image, and the like.

The TWAIN driver 402 has a function of transferring the read image from the scanner 200 to the TWAIN application 401 in accordance with the TWAIN standard. The TWAIN driver 402 further has functions of executing the cropping method, rotating process, gamma correction, various kinds of color adjustment, and the like of the read image received from the scanner 200.

The TWAIN driver 402 has a unique GUI. The user makes various reading settings through this GUI and also makes confirmation of a preview image, setting of a reading range, and the like. Further, the TWAIN driver 402 has a function of reading the image from the scanner without displaying the unique GUI in accordance with the reading settings designated from the TWAIN application 401 in the GUI non-display manner.

A method whereby the TWAIN driver 402 displays the unique GUI is called a UI display mode. A method whereby the TWAIN driver 402 does not display the GUI is called a UI non-display mode. In the TWAIN standard, the operations of both modes have been standardized.

In the embodiment 1, the TWAIN driver 402 operates in the UI non-display mode.

A device driver 403 performs transmission and reception of a dedicated command to/from the scanner 200 and makes various reading settings for the scanner 200, flow control for image reading, and the like.

An operating system (OS) 404 is an operating system such as "Windows (registered trademark)", "MacOS (registered trademark)", or the like.

Figure 5:
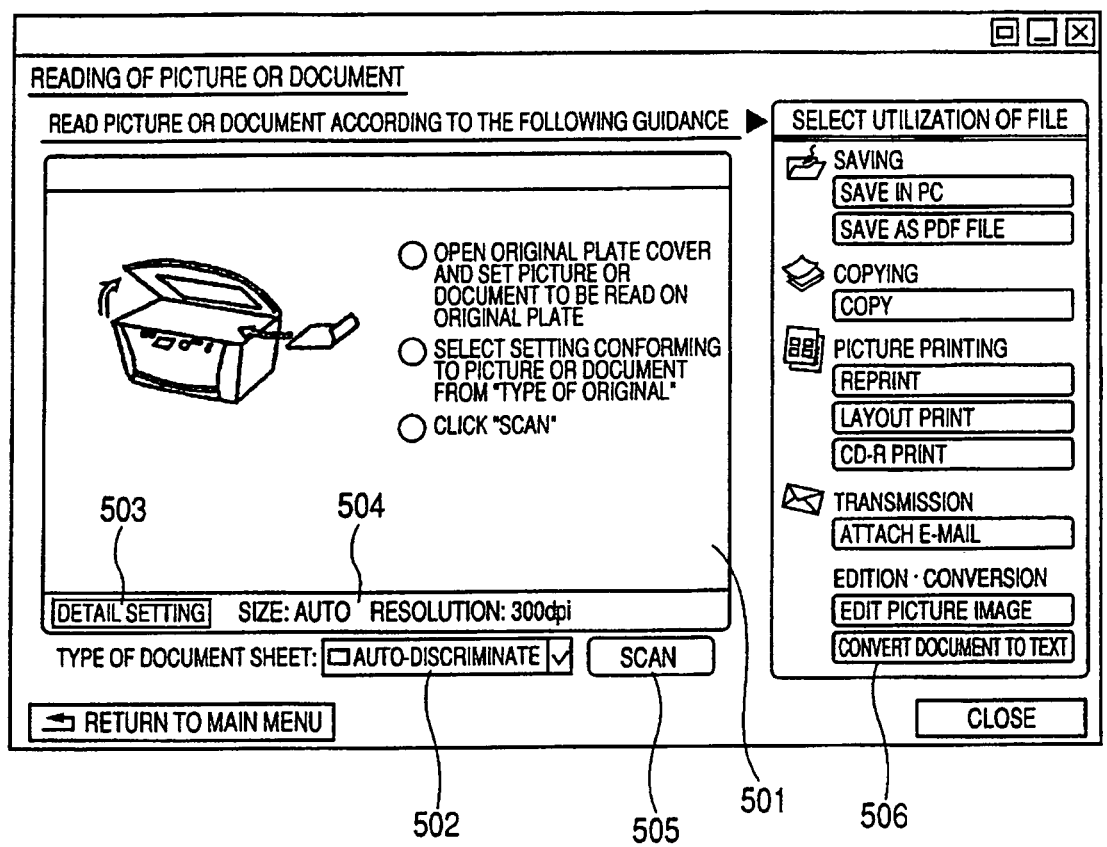
FIG. 5 is a diagram showing an example of a GUI display screen according to a TWAIN application 401 in the embodiment 1.

FIG. 5 is a diagram showing an example of a GUI display screen according to the TWAIN application 401 in the embodiment 1.

That is, FIG. 5 shows a state before the original sheet is read. A guidance to read the original sheet is displayed in a preview area 501.

The preview area 501 is used as an area to display the read image. One or a plurality of images can be displayed in the preview area 501.

In a "type of original sheet" combo box 502 for setting the type of original sheet, it is possible to select either an "auto-discriminate" mode to automatically discriminate the type of original sheet or a mode to manually select the type of original sheet such as "color picture", "color document", "monochromatic document", or the like.

A "details setting" button 503 displays a details setting dialog for reading (not shown). In the details setting dialog for reading, various reading settings such as "original sheet size", "reading resolution", "moire removal ON/OFF", "outline emphasis ON/OFF", and the like can be made.

However, if the "auto-discriminate" mode has been set in the "type of original sheet" combo box, the reading size is fixed to "auto-reading".

If the "auto-discriminate" mode has been set in the "type of original sheet" combo box, when the scan is executed, the TWAIN driver 402 reads the image on the whole area of the original plate of the scanner 200 and automatically discriminates the type of original sheet on the basis of the color characteristics information of the image on the whole area of the original plate. In accordance with this discrimination result, the cropping method of the image is automatically switched and one or a plurality of images are cropped.

Therefore, since the number of read images and the sizes thereof which are transferred from the TWAIN driver 402 to the TWAIN application 401 cannot be specified before the scanning, if the "auto-discriminate" mode has been set in the "type of original sheet", the reading size is fixed to "auto-reading".

In a display area 504, of the "reading size" and "reading resolution", the settings selected in the details setting dialog are displayed.

By clicking a scan button 505, the reading process is executed. As execution buttons 506 to execute various processes to the read image, buttons for "save into file", "reprint" (extra printing), "attach E-mail", and the like are prepared. Since those processes have been well-known, their detailed explanation is omitted here.

The process of the TWAIN driver 402 will now be described.

Figure 6:
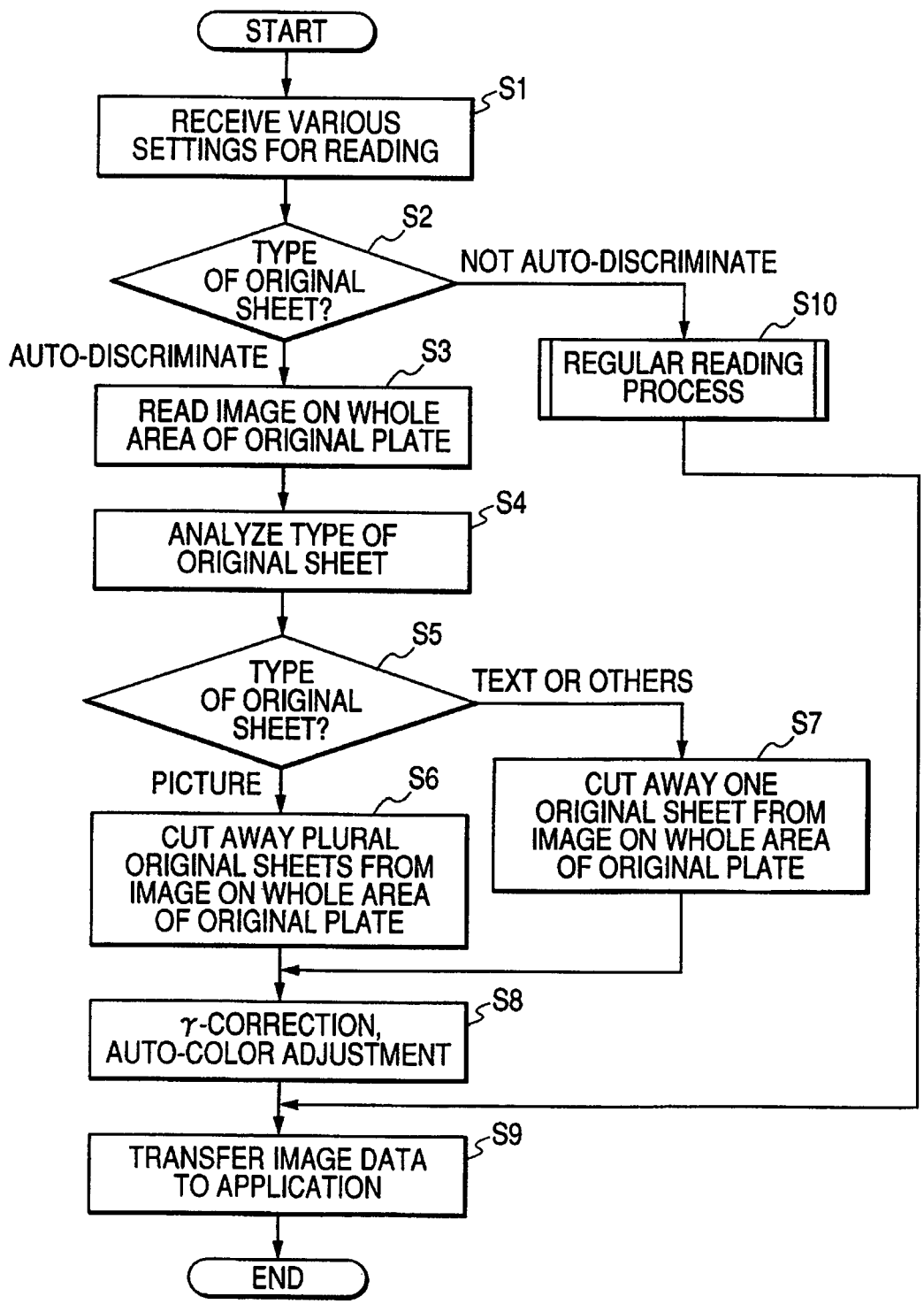
FIG. 6 is a flowchart showing details of a process of a TWAIN driver 402 in the embodiment 1.

FIG. 6 is a flowchart showing details of the process of the TWAIN driver 402 in the embodiment 1.

The TWAIN driver 402 is activated in the UI non-display mode from the TWAIN application 401. In step S1, the TWAIN driver 402 receives the information about the type of original sheet, reading size, reading resolution, and various settings for reading from the TWAIN application 401. When the TWAIN driver 402 receives a reading start message, the processing routine advances to step S2.

In step S2, the TWAIN driver 402 discriminates the set type and reading size of original sheet from the TWAIN application 401. If the type of original sheet indicates "auto-discriminate", the processing routine advances to step S3. If the type of original sheet indicates a mode other than "auto-discriminate", step S10 follows.

The operation in the case where "auto-discriminate" has been set into the type of original sheet in the embodiment 1 will now be described.

In step S3, the TWAIN driver communicates with the scanner 200 and reads the image on the whole area of the original plate including the original sheet set on the original plate of the scanner 200 at the reading resolution set in step S1.

In the case of reading the image data of the image on the whole area of the original plate, full-color dot-sequential data of the colors of R, G, and B each consisting of 8 bits is received from the scanner 200 and temporarily saved into a hard disk or a temporary storing area in the RAM or the like.

In step S4, the color characteristics information such as a color density histogram or the like of the image on the whole area of the original plate which has temporarily been saved is analyzed, thereby discriminating which one of "picture", "text", and "others" the type of original sheet indicates.

In step S5, if the type of original sheet indicates "picture" as a discrimination result about the type of original sheet, the processing routine advances to step S6. In the case of the original sheet whose type is "text" or "others", a process of step S7 is executed.

In step S6, the cropping method of one or a plurality of pictures is executed by the multi-crop process. The cropping method of one or a plurality of pictures by the multi-crop process will be explained hereinafter.

In step S7, the blank cropping method of one original sheet is executed by the auto-crop process. The cropping method of one original sheet by the auto-crop process will be explained hereinafter.

In step S8, the gamma correction and the automatic color adjusting process are executed to one or a plurality of images cropped in step S6 or step S7. In step S8, the optimum color correcting process corresponding to the type of original sheet discriminated in step S5 is executed. For example, if the type of original sheet is determined to be "text", the color correction data only for use in text data is used for the color correcting process and, further, an under color removal process and the like are executed.

That is, by discriminating the type of original sheet, two methods such as original sheet cropping method and optimum color correction processing method can be selected.

In step S9, after the original sheet was cropped, the color-corrected image data is transferred to the TWAIN application 401. In step S10, the reading process in the case where a mode other than "auto-discriminate" has been set with respect to the type of original sheet and the reading size is executed. For example, "color picture", "monochromatic document", and the like are set in the type of original sheet, and auto-cropping such as "multi-crop" or "auto-crop" and a regular size such as "A4", "L size", or the like are set in the reading size. Since the reading process of step S10 is a regular reading process which has generally been well-known, its details are omitted here. After the reading process of step S10 was executed, the processing routine advances to step S9.

Figure 7:
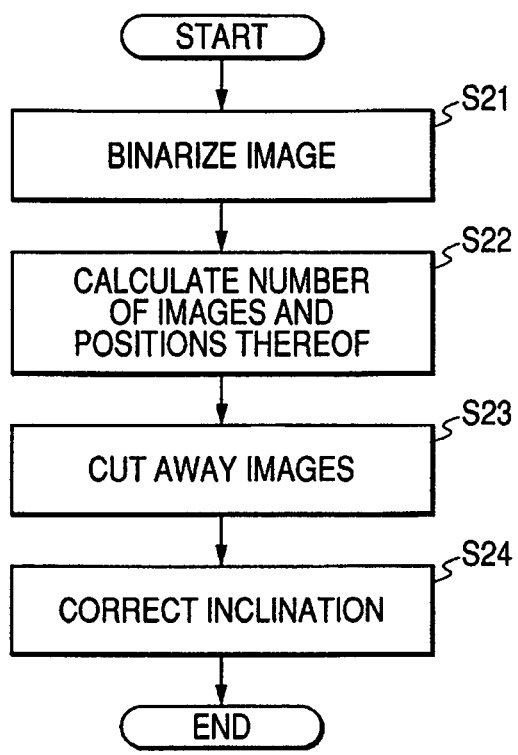
FIG. 7 is a flowchart showing details of a multi-crop process in the TWAIN driver 402.

FIG. 7 is a flowchart showing details of the multi-crop process in the TWAIN driver 402.

In step S21, the 24-bit full-color image on the whole area of the original plate which has been read as a preparation for the main process is converted into a monochromatic (black and white) binary 2-bit image. In this instance, a value of G is compared with a predetermined threshold value. If it is equal to or larger than the threshold value, each pixel is converted into white, and if it is less than the threshold value, each pixel is converted into black, thereby forming the monochromatic binary image from the full-color image.

In the read image on the whole area of the original plate, in the portion corresponding to the area where no original sheet is put on the original plate, the white portion of the original plate cover is read and all of pixel values of R, G, and B are equal to 255 (0xFF). Therefore, by setting the threshold value to a value near 255 (0xFF), the presence or absence of the original sheet can be discriminated.

In step S22, the number of original sheets and the positions and sizes thereof are detected from the monochromatic binary image, thereby deciding cropping areas.

An example of the cropping area deciding operation in the multi-crop mode in the embodiment 1 will now be described.

In the case where the four pictures 702, 703, 704, and 705 are set onto the original plate 701 as shown in FIG. 8A, if the monochromatic binary image on the whole area of the original plate is formed and the cropping areas are calculated, four cropping areas 706, 707, 708, and 709 can be obtained as shown in FIG. 8B.

In step S23, since the full-color images are cropped from the full-color image on the whole area of the original plate in accordance with the cropping areas obtained in step S24, the image data corresponding to the original sheet area can be obtained.

In step S24, an inclination of each image cropped in step S23 is corrected.

The auto-crop process of the TWAIN driver 402 will now be described.

In a manner similar to the multi-crop process, in the auto-crop process, the 24-bit full-color image on the whole area of the original plate which has been read in the preparation is converted into a monochromatic binary image. From this image, the position and size of the original sheet are detected, thereby deciding the cropping areas. However, in the auto-crop process, one rectangular area is determined unlike the case of the multi-crop process.

An example of the deciding operation of the cropping area in the auto-crop mode in the embodiment 1 will now be explained.

Figure 9A:
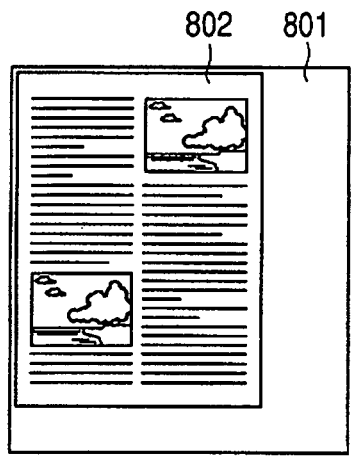
FIGS. 9A, 9B, 9C and 9D are explanatory diagrams of the image reading apparatus.
Figure 9B:
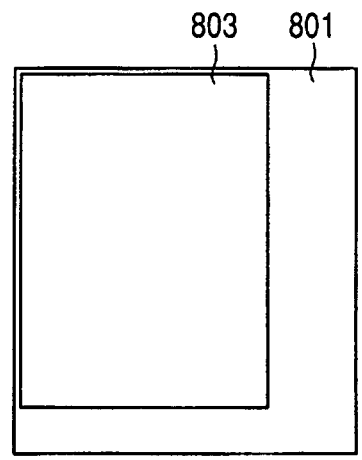

In the case where the original sheet 802 is set on the original plate 801 as shown in FIG. 9A, a monochromatic binary image on the whole area of the original plate is formed and a cropping area is calculated, so that a cropping area 803 shown in FIG. 9B can be derived.

Figure 9C:
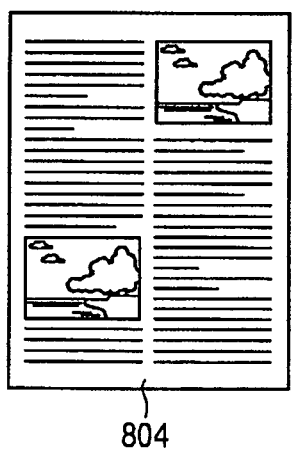
Figure 9D:
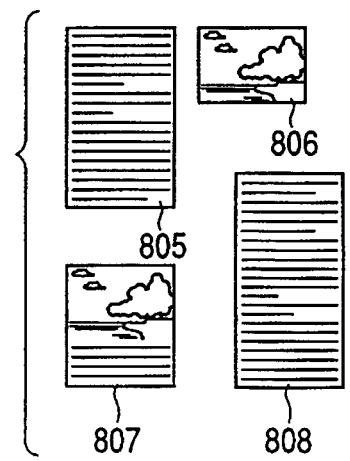

A single image shown in FIG. 9C is cropped from the full-color image on the whole area of the original plate in accordance with the cropping area 803.

As mentioned above, according to the embodiment 1, the image on the whole area of the original plate is read and the type of original sheet is automatically discriminated from the color characteristics information of the read image. If the discrimination result indicates "picture", the original sheet is cropped by the multi-crop process. If the discrimination result indicates "text" or "others", the original sheet is cropped by the auto-crop process. Therefore, even in the case of arranging one original sheet onto the original plate and in the case of arranging one or a plurality of pictures thereon, the desired image can be automatically and properly obtained without selecting the cropping method by the user.

In the embodiment 1, the reading settings have been made by the TWAIN application and the TWAIN driver operates in the UI non-display mode. It is also possible to construct in such a manner that the TWAIN driver operates in the UI display mode, the "auto-discriminate" mode is provided for the reading settings of the TWAIN driver GUI, and upon previewing, the type of original sheet is discriminated, and the cropping method of the cropping area to be displayed on the UI preview is automatically switched in accordance with the type of original sheet.

Although the reading apparatus is constructed by the host computer and the scanner in the embodiment 1, in the case where the copying process of the picture or original sheet is executed by an apparatus such as an MFP (multi-function printer) having the original sheet reading function and the function of recording onto a sheet, it is also possible to construct in such a manner that the type of original sheet is automatically discriminated and by switching the cropping method of the original sheet in accordance with a discrimination result, the cropped images are recorded onto different sheets.

This application claims priority from Japanese Patent Application No. 2005-101551 filed on Mar. 31, 2005, which is hereby incorporated by reference herein.

What is claimed is:

1. An image processing apparatus comprising:
an acquiring unit configured to acquire a read image obtained by reading of one or more originals which are arranged together on an original plate of a reading apparatus and are read;
a first cropping unit configured to execute a first cropping method for cropping one image area from the read image acquired by the acquiring unit;
a second cropping unit configured to execute a second cropping method for cropping individually a plurality of image areas from the read image acquired by the acquiring unit;
a specifying unit configured to specify one or more candidate regions corresponding to the one or more originals in the read image acquired by the acquiring unit;

a determining unit configured to determine a type of the one or more candidate regions corresponding to the one or more originals specified by the specifying unit, by analyzing the one or more candidate regions in the read image; and an outputting unit configured to select a cropping method to be executed on the read image and to output one or more images cropped by the selected cropping method, wherein the outputting unit (1) selects the first cropping method responsive to a determination by the determining unit that the one or more candidate regions include a characters region and a picture region, and outputs an image including the characters region and the picture region cropped from the read image by the first cropping unit, and (2) selects the second cropping method responsive to a determination by the determining unit that all of the one or more candidate regions are picture regions, and outputs individually a plurality of images corresponding to the picture regions cropped from the read image by the second cropping unit.

2. An image processing apparatus according to claim 1, wherein the determining unit determines whether the one or more candidate regions all are or are not a picture region only, and in a case where the determining unit determines that all of the one or more candidate regions are picture regions only, the outputting unit selects the second cropping method, and outputs a plurality of images corresponding to the respective picture regions individually.

3. An image processing apparatus according to claim 1, further comprising a color correcting process selecting unit configured to select a color correction processing method of the image to be cropped, in accordance with the determination of the type of the one or more candidate regions determined by the determining unit.

4. An image processing apparatus according to claim 1, wherein the acquiring unit acquires the read image obtained by a reading of a predetermined area, of the original plate of the reading apparatus, on which one or more originals may be arranged.

5. An image processing apparatus according to claim 1, wherein the first cropping method is an auto-crop method and the second cropping method is a multi-crop method.

6. An image processing method, comprising:
acquiring a read image obtained by reading of one or more originals which are arranged together on an original plate of a reading apparatus and are read;
specifying one or more candidate regions corresponding to the one or more originals in the read image;
determining a type of the one or more candidate regions corresponding to the one or more originals specified by the specifying step, by analyzing the one or more candidate regions in the read image;
responsive to a determination that the one or more candidate regions include a characters region and a picture region, selecting a first cropping method for cropping one image area from the read image, and outputting an image including the characters region and the picture region cropped from the read image by the first cropping method; and
responsive to a determination that all of the one or more candidate regions are picture regions, selecting a second cropping method for cropping individually a plurality of image areas from the read image, and outputting individually a plurality of images corresponding to the picture regions cropped from the read image by the second cropping method.

7. An image processing method according to claim 6, wherein, in a case where the one or more candidate regions are all determined to be picture regions only, the second cropping method is selected and a plurality of images corresponding to the respective picture regions are output individually.

8. An image processing method according to claim 6, further comprising selecting a color correcting processing method of the image to be cropped, in accordance with the determined type of the of the one or more candidate regions.

9. A non-transitory computer-readable memory medium which retrievably stores a program for executing the method according to claim 6.

10. An image processing method according to claim 6, wherein the read image is obtained by a reading of a predetermined area, of the original plate of the reading apparatus, on which one or more originals may be arranged.

11. An image processing method according to claim 6, wherein the first cropping method is an auto-crop method and the second cropping method is a multi-crop method.

* * * * *